(12) United States Patent
Devereaux et al.

(10) Patent No.: US 11,887,142 B1
(45) Date of Patent: *Jan. 30, 2024

(54) INSURANCE POLICY MODIFICATIONS USING INFORMATIC SENSOR DATA

(71) Applicant: United Services Automobile Association, San Antonio, TX (US)

(72) Inventors: Ramsey Devereaux, San Antonio, TX (US); David S. Franck, San Antonio, TX (US); Michael J. Allen, San Antonio, TX (US); Daniela Wheeler, Borne, TX (US); Spencer Read, Helotes, TX (US); Traci K. Uribe, San Antonio, TX (US); Ina L. Jackson, Schertz, TX (US); Kathleen L. Swain, Peoria, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 375 days.

This patent is subject to a terminal disclaimer.

(21) Appl. No.: 17/379,688

(22) Filed: Jul. 19, 2021

Related U.S. Application Data

(63) Continuation of application No. 16/034,305, filed on Jul. 12, 2018, now Pat. No. 11,068,992, which is a continuation of application No. 15/652,053, filed on Jul. 17, 2017, now Pat. No. 10,121,207, which is a continuation of application No. 14/251,404, filed on Apr. 11, 2014, now Pat. No. 9,710,858.

(Continued)

(51) Int. Cl.
*G06Q 40/08* (2012.01)
*G06Q 30/0207* (2023.01)
*G06Q 40/00* (2023.01)

(52) U.S. Cl.
CPC ........ *G06Q 30/0215* (2013.01); *G06Q 40/08* (2013.01); *G06Q 40/00* (2013.01)

(58) Field of Classification Search
CPC .................................................... G06Q 40/08
See application file for complete search history.

(56) References Cited

U.S. PATENT DOCUMENTS

| | | | |
|---|---|---|---|
| 8,106,769 B1 * | 1/2012 | Maroney | G06Q 10/10 340/540 |
| 8,635,091 B2 * | 1/2014 | Amigo | G06Q 40/08 705/35 |

(Continued)

*Primary Examiner* — Edward Chang
(74) *Attorney, Agent, or Firm* — Fletcher Yoder, P.C.

(57) ABSTRACT

A computer device and method for processing risk related data to affect changes to an insurance policy whereby one or more terms of an insurance policy associated with an insured and informatic data from a plurality of sensor devices are received by a computer processor. Analysis is performed on the received informatic data to determine a risk assessment value regarding the insured and/or other risks relevant to the insurance policy, such as a dwelling. Predefined business rules are then applied using at least the determined risk assessment value to determine if conditions have been met to allow or require modification of the insurance policy whereafter modification of one or more terms of the insurance policy is performed if the insurance policy associated with the insured permits modification.

20 Claims, 3 Drawing Sheets

Related U.S. Application Data

(60) Provisional application No. 61/948,192, filed on Mar. 5, 2014, provisional application No. 61/943,897, filed on Feb. 24, 2014, provisional application No. 61/943,901, filed on Feb. 24, 2014, provisional application No. 61/943,906, filed on Feb. 24, 2014, provisional application No. 61/926,532, filed on Jan. 13, 2014, provisional application No. 61/926,536, filed on Jan. 13, 2014, provisional application No. 61/926,541, filed on Jan. 13, 2014, provisional application No. 61/926,534, filed on Jan. 13, 2014, provisional application No. 61/926,121, filed on Jan. 10, 2014, provisional application No. 61/926,111, filed on Jan. 10, 2014, provisional application No. 61/926,103, filed on Jan. 10, 2014, provisional application No. 61/926,095, filed on Jan. 10, 2014, provisional application No. 61/926,091, filed on Jan. 10, 2014, provisional application No. 61/926,108, filed on Jan. 10, 2014, provisional application No. 61/926,123, filed on Jan. 10, 2014, provisional application No. 61/926,098, filed on Jan. 10, 2014, provisional application No. 61/926,118, filed on Jan. 10, 2014, provisional application No. 61/926,119, filed on Jan. 10, 2014, provisional application No. 61/926,114, filed on Jan. 10, 2014.

(56) References Cited

U.S. PATENT DOCUMENTS

| | | | |
|---|---|---|---|
| 2007/0174467 A1* | 7/2007 | Ballou, Jr. | H04L 63/0838 709/227 |
| 2014/0136242 A1* | 5/2014 | Weekes | G06Q 40/08 705/4 |

* cited by examiner

INSURANCE POLICY MODIFICATIONS USING INFORMATIC SENSOR DATA

CROSS REFERENCE TO RELATED APPLICATIONS

This is a continuation application of U.S. patent application Ser. No. 16/034,305, filed on Jul. 12, 2018, which is a continuation of U.S. patent application Ser. No. 15/652,053, filed on Jul. 17, 2017, which is a continuation application of U.S. patent application Ser. No. 14/251,404, filed on Apr. 11, 2014, which claims priority to U.S. Provisional Patent Application Ser. Nos. 61/926,093, filed Jan. 10, 2014; 61/926,091, filed Jan. 10, 2014; 61/926,095 filed Jan. 10, 2014; 61/926,098, filed Jan. 10, 2014; 61/926,103, filed Jan. 10, 2014; 61/926,108, filed Jan. 10, 2014; 61/926,111, filed Jan. 10, 2014; 61/926,114, filed Jan. 10, 2014; 61/926,118, filed Jan. 10, 2014; 61/926,119, filed Jan. 10, 2014; 61/926,121, filed Jan. 10, 2014; 61/926,123, filed Jan. 10, 2014; 61/926,536, filed Jan. 13, 2014; 61/926,541, filed Jan. 13, 2014; 61/926,534, filed Jan. 13, 2014; 61/926,532, filed Jan. 13, 2014; 61/943,897, filed Feb. 24, 2014; 61/943,901, filed Feb. 24, 2014; 61/943,906, filed Feb. 24, 2014; and 61/948,192, filed Mar. 5, 2014, which are all incorporated herein by reference in their entirety.

FIELD OF THE INVENTION

The disclosed embodiments generally relate to a method and computerized system for managing insurance and related products and services, and more particularly, to modifying insurance policy terms based on informatic data.

BACKGROUND OF THE INVENTION

Smart house functionality is a maturing space, but the opportunity for insurance companies remains largely untapped. Thus, the terms of insurance policies, such as homeowner insurance policies, may not be reflective of the true nature of the risks being insured.

Accordingly, there is an unmet need for measuring information relating to an insured risk, such as a residence or structures located on the residence premises, and utilizing that information to make appropriate modifications to insurance policy terms, such as the deductible amount.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, illustrative embodiments of a computer device and method are disclosed for processing risk related data to affect changes to an insurance policy whereby one or more terms of an insurance policy associated with an insured and informatic data from a plurality of sensor devices are received by a computer processor. Analysis is performed on the received informatic data to determine a risk assessment value regarding the insured and/or other risks relevant to the insurance policy. Predefined business rules are then applied using at least the determined risk assessment value to determine if conditions have been met to allow or require modification of the insurance policy whereafter modification of one or more terms of the insurance policy is performed if the insurance policy associated with the insured permits this modification.

This summary section is provided to introduce a selection of concepts in a simplified form at are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
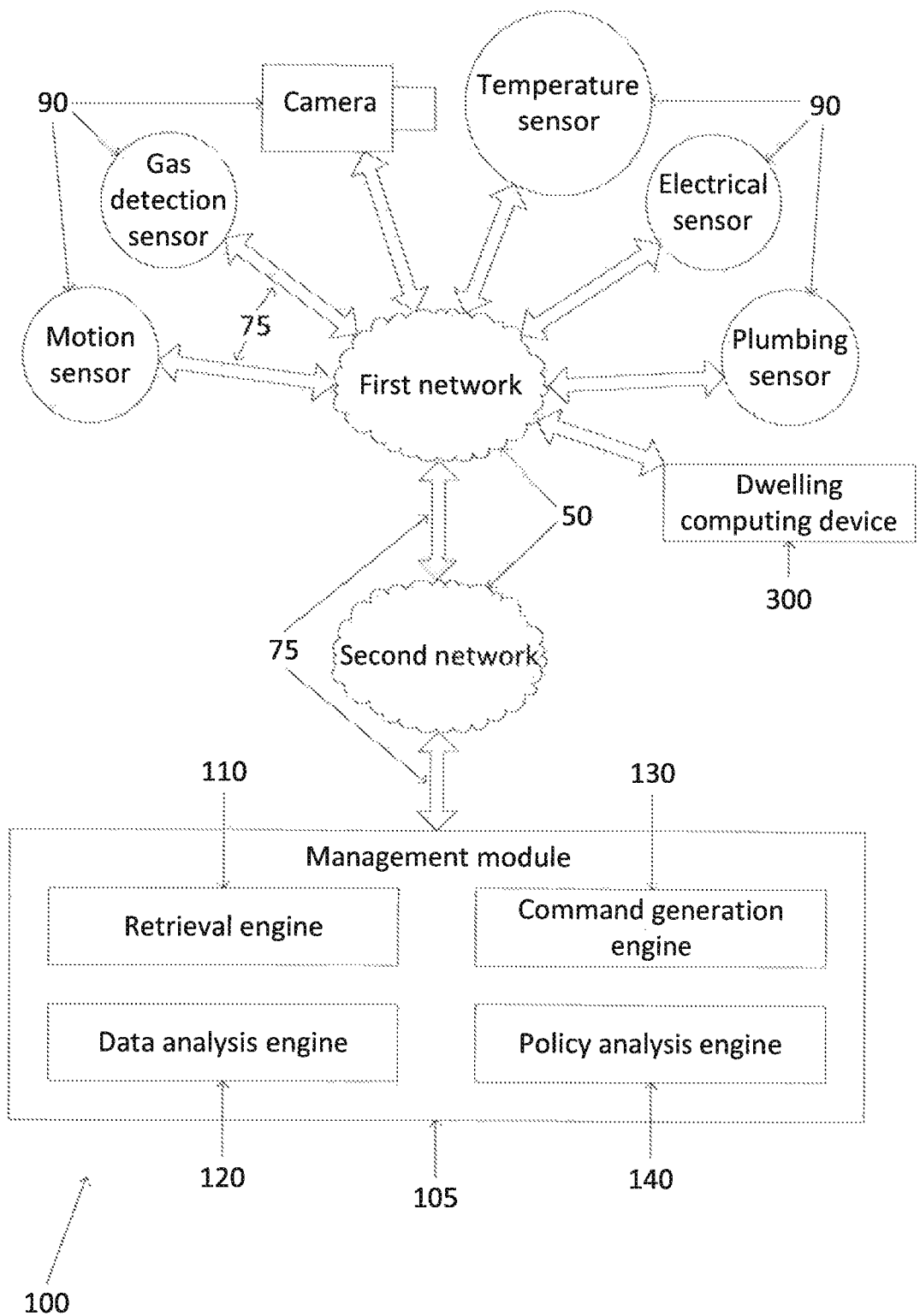
FIG. 1 illustrates an example system for utilizing structural informatics to inform term changes to an insurance policy.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above.

One skilled in the art will appreciate further features and advantages of the illustrated embodiments based on the above-described embodiments. Accordingly, the illustrated embodiments are not to be limited by what has been particularly shown and described, except as indicated by the appended claims. Commonly assigned U.S. Pat. Nos. 8,289,160 and 8,400,299 are related to certain embodiments described herein and are each incorporated herein by reference in their entirety.

As used herein, the term "risk related data" means data or information that may be relevant to an insurance company's decisions about underwriting, pricing, and other terms or conditions on which it is willing to issue insurance policies.

As used herein, the term "insurance policy" refers to a contract between an insurer, also known as an insurance company, and an insured, also known as a policyholder, in which the insurer agrees to indemnify the insured for specified losses, costs, or damages on specified terms and conditions in exchange of a certain premium amount paid by the insured. In a typical situation, when an insured suffers some loss for which he/she may have insurance, the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, automobile, personal property, and other insurance policies known by those skilled in the art.

As used herein, the term "dwelling" means a building or structure in which one or more persons reside, including a single family home, duplex, apartment building or other multi-family structure, a mobile home, and/or a manufactured home.

Turning now descriptively to the drawings, FIG. 1 depicts an exemplary system 100 communicatively connected to sensors at a dwelling in which below illustrated embodiments may be implemented.

It is to be understood that first and second networks 50 are each a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a dwelling, structure, residence or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Communications 75 represents computerized communications as known by those skilled in the art. For instance, communications 75 may be wired links or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. For exemplary purposes and without limitations, examples of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the server computer, partly on the server computer, as a stand-alone software package, partly on the server computer and partly on a remote computer (such as dwelling computing device 300) or entirely on the remote computer. In the latter scenario, the remote computer may be connected to the server computer through any type of network, including a local area network (LAN) or a wide area network (WAN), a combination thereof, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Turning to FIG. 1, system 100 preferably includes sensors 90 and management module 105 that preferably includes retrieval engine 110, data analysis engine 120, command generation engine 130 and policy analysis engine 140. In one embodiment, first network 50 is a LAN and second network 50 is a WAN (best shown in FIG. 1), such as the internet, although it is contemplated herein that networks 50 may be any system and/or method of computerized communications as understood by those skilled in the art.

Figure 2:
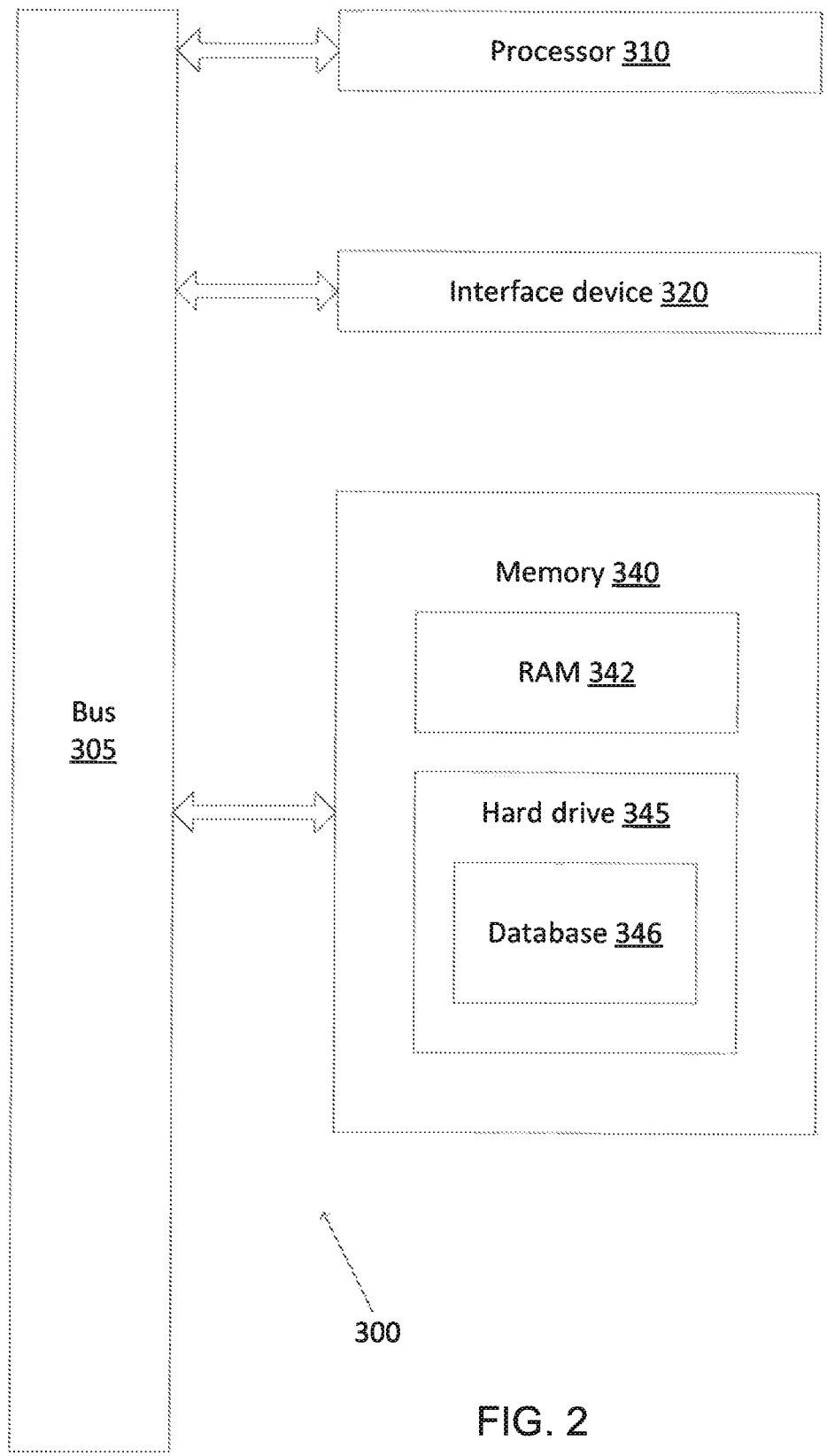
FIG. 2 illustrates a network computer device/node in accordance with an illustrated embodiment.

FIG. 2 is a schematic block diagram of an example computing device 300 that may be used (or components thereof) with one or more embodiments described herein. As explained above, in different embodiments these various devices be configured to communicate with each other in any suitable way, such as, for example, via communication 75 over networks 50.

Device 300 is only one example of a suitable system and is not intended to suggest any limitation as to the scope of use or functionality of embodiments of the invention described herein. Regardless, computing device 300 is capable of being implemented and/or performing any of the functionality set forth herein.

Computing device 300 is operational with numerous other general purpose or special purpose computing system environments or configurations. Examples of well-known computing systems, environments, and/or configurations that may be suitable for use with computing device 300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 300 may be described in the general context of computer system-executable instructions, such as program modules, being executed by a computer system. Generally, program modules may include routines, programs, objects, components, logic, data structures, and so on that perform particular tasks or implement particular abstract data types. Computing device 300 may be practiced in distributed data processing environments where tasks are performed by remote processing devices that are linked through a communications network. In a distributed data processing environment, program modules may be located in both local and remote computer system storage media including memory storage devices.

Device 300 is shown in FIG. 2 in the form of a general-purpose computing device. The components of device 300 may include, but are not limited to, one or more processors or processing units 310, a system memory 340, interface device 320, and a bus 305 that couples various system components including system memory 340 to processor 310.

Bus 305 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 300 typically includes a variety of computer system readable media. Such media may be any available media that is accessible by device 300, and it includes both volatile and non-volatile media, removable and non-removable media.

System memory 340 can include computer system readable media in the form of volatile memory, such as random access memory (RAM) 342, cache memory, and hard drive 345, which may include database 346. Computing device 300 may further include other removable/non-removable, volatile/non-volatile computer system storage media. By way of example only, hard drive 345 can be provided for reading from and writing to a non-removable, non-volatile magnetic media. Interface device 320 includes, without limitation, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 305 by one or more data media interfaces. As will be further depicted and described below, memory 340 may include at least one program product having a set (e.g., at least one) of program modules that are configured to carry out the functions of embodiments of the invention.

Management module 105, preferably has a set (at least one) of engines, such as retrieval engine 110, data analysis engine 120, command generation engine 130 and policy analysis engine 140 described below, may be stored in memory 340 by way of example, and not limitation, as well as an operating system, one or more application programs, other program modules, and program data. Each of the operating system, one or more application programs, other program modules, and program data or some combination thereof, may include an implementation of a networking environment. Management module 105 generally carry out the functions and/or methodologies of embodiments of the invention as described herein.

Device 300 may also communicate with one or more interface devices 320 such as a keyboard, a pointing device, a display, etc.; one or more devices that enable a user to interact with computing device 300; and/or any devices (e.g., network card, modem, etc.) that enable computing device 300 to communicate with one or more other computing devices. Such communication can occur via Input/Output (I/O) interfaces. Still yet, device 300 can communicate with one or more networks such as a local area network (LAN), a general wide area network (WAN), and/or a public network (e.g., the Internet) via a network adapter 320. As depicted, network adapter 320 communicates with the other components of computing device 300 via bus 305. It should be understood that although not shown, other hardware and/or software components could be used in conjunction with device 300. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With regards to the sensors 90 shown in FIG. 2, each sensor 90 preferably captures certain data related to a structure. It is contemplated herein that structures include any type of building (e.g., residential, commercial, retail, municipal, etc.) in which the capture and analysis of sensor data is useful for the reasons at least described herein. In one embodiment, sensors 90 communicate directly with management module 105. However, it is contemplated herein that sensors 90 may communicate with computing device 300 operating on the same network 50 (best shown in FIG. 1). In this embodiment, computing device 300 receives information from sensors 90 and communicates the information to management module 105. Computing device 300 may immediately transfer the information to management module 105, it may be a delayed transfer (e.g., scheduled for the middle of the night when internet usage is low), and/or it may be any communication methodology as known by those skilled in the art. Computing device 300 is preferably configured and operational to receive (capture) data from various sensors 90 regarding certain measured aspects of the dwelling and transmit that captured data to a management module 105 via network 50. It is noted that device 300 may perform analytics regarding the captured sensor data regarding the structure, and/or management module 105, preferably located or controlled by an insurance company/carrier, may perform such analytics, as also further described below. Further, sensors 90 may be connected to computing device 300 by wire, or by a wireless technology, or via any communication methodology as known by those skilled in the art.

Although various sensor types are illustrated in FIG. 1 and described below, the sensor types described and shown herein are not intended to be exhaustive as embodiments of the present invention may encompass any type of known or unknown sensor type which facilitates the purposes and objectives of the certain illustrated embodiments described herein. Exemplary sensor types include (but are not limited to):

Motion sensor—One type of motion sensor 90 detects motion within a range of sensor 90. Thus, motion sensor 90 may be placed to detect when people, animals and/or objects move within sensor's 90 field of vision. Another type of sensor 90 may sense motion in the structure to which sensor 90 is attached. Although structures typically do not move, in the event of an earthquake, flood, damage to that part of the structure, and/or other devastating event, motion sensor 90 may detect the movement of the structure itself.

Temperature sensor—Temperature sensor 90 detects the temperature of the desired medium. Thus, temperature sensor 90 may be configured to measure the temperature of ambient air or of a specific surface (e.g., the wall to which temperature sensor 90 is attached). It is contemplated herein that temperature sensor 90 may be placed outside the structure (e.g., on an outside wall and/or the roof), inside the structure (e.g., on an interior wall, an interior ceiling, an interior floor, a basement, an attic, a kitchen, a bathroom, a bedroom, a workspace, etc.), or at a boundary therebetween.

Humidity sensor—As with other sensors 90, humidity sensor 90 may be placed anywhere inside/outside/on the structure as recognized by those skilled in the art.

Gas detection sensor—Detects the presence of various gasses. As with other sensors 90, gas detection sensor 90 may be placed anywhere inside/outside/on the structure as recognized by those skilled in the art. For exemplary purposes only and without limitation, gas detection sensor may be configured to detect the presence of carbon monoxide (or any other harmful gasses, such as radon), oxygen, and/or methane (or any other flammable gasses). Further, the readings may be binary (e.g., either the gas is present or it is not present), or the readings may be quantitative (e.g., the percentage of air the comprises the gas, parts per million of the gas).

Smoke detector sensor—Detects the presence of smoke. As with other sensors 90, smoke detection sensor 90 may be placed anywhere inside/outside/on the structure as recognized by those skilled in the art. The readings of smoke detection sensor may be binary (e.g., either the gas is present or it is not present), or the readings may be quantitative (e.g., the percentage of air the comprises smoke, parts per million of smoke).

Water pressure sensor—Detects the water pressure at various locations within the structure. Water pressure sensors 90 may be placed anywhere inside or outside the structure and thus may provide information related to the stresses being induced upon the structure's plumbing system (including sewer lines, water lines, HVAC system, appliances, and automatic fire suppression systems). This information may be utilized by management module to indicate a plumbing system that is operating close to stress limits, and thus, a structure for which water damage may be more likely.

Water flow sensor—Detects the amount of water flowing through selected points in the plumbing system (including sewer lines, water lines, HVAC system, appliances, and automatic fire suppression systems). Water flow sensor 90 may be placed anywhere inside or outside the structure and thus may provide information related to the amount of water being routed to the structure, and more particularly, which parts of the structure are receiving exactly (or approximately) how much water.

Wind speed sensor—Wind speed sensor 90 detects the wind speed at that location and may be placed anywhere inside or outside the structure.

Air pressure sensor—Air pressure sensor 90 may be placed anywhere inside or outside the structure. This information may be analyzed, for example, to determine how quickly and easily the structure equalizes air pressure changes to the outside ambient air.

Electrical system sensor—Electrical system sensor 90 detects the operational parameters of the structure's electrical system. Readings from sensor 90 could be used to determine if the voltage is (persistently) too high, too low, or if the voltage frequently drops and/or spikes. Such conditions may suggest that the dwelling 300 is at risk for fire. Other types of electrical measurements could be taken, such as readings of current flowing through the electrical system. Still other types of electrical measurements could be determined include how energy is used and at what times of day it is used, etc.

Structural sensor—Structural sensor 90 may be configured to detect the (changing) conditions of the structure's elements (e.g., support beams, floors, ceilings, roofs, walls, etc.). Structural readings from one or more locations inside and/or outside the structure could thus be recorded by sensor 90 and transmitted to management module 105.

Environmental Sensor—Environmental sensor 90 may be configured to detect various environmental conditions relating to the structure 300, such as the air quality present in the structure, the presence of mold/bacteria/algae/lead paint or any contaminant adverse to human health (whether airborne or attached to a portion of the structure of the structure).

Camera Sensor—Camera sensors include visible light cameras, infrared cameras, two-dimensional (2D) cameras, three-dimensional (3D) cameras, thermal cameras, aerial imagery cameras, Smartphone camera images, radar-capable sensors, sensors that detect other wavelengths, and/or any combination thereof.

With exemplary sensors 90 identified and briefly described above, and as will be further discussed below, it is to be generally understood sensors 90 preferably record certain data parameters relating to products and services provided by an insurance carrier, such as USAA, to determine insurance policy modifications and other value added services such as those described below. It is to be understood and appreciated the aforementioned sensors 90 may be configured as wired and wireless types integrated in a networked environment (e.g., WAN, LAN, WiFi, 802.11X, 3G, LTE, etc.), which may also have an associated IP address. It is to be further appreciated the sensors 90 may consist of internal sensors located within the interior of a structure; external sensors located external of a structure; sound sensors for detecting ambient noise (e.g., for detecting termite and rodent activity, glass breakage, intruders, etc.); camera sensors (e.g., visible light, infrared light and/or any wavelength) such as those consisting of camera standalone devices, or by integrating into existing camera devices in a structure. It is additionally to be understood and appreciated that sensors 90 can be networked into a central computer hub (e.g., device 300) in a dwelling to aggregate collected sensor data packets or sensors 90 may be communicatively connected to other sensors 90 and/or dwelling computing device 300 (e.g., hard wired to either). Aggregated data packets can be analyzed in either a structure computer system (e.g., device 300) or via an external computer environment (e.g., management module 105). Additionally, it is to be understood data packets collected from sensors 90 can be aggregated in structure computing device 300 and sent as an aggregated packet to management module 105 for subsequent analysis whereby data packets may be transmitted at prescribed time intervals (e.g., a benefit is to reduce cellular charges in that some structures may not have Internet access or to send during low internet usage hours).

In accordance with an illustrated embodiment, in addition to the aforementioned, dwelling computing device 300 may additionally be coupled to a clock which may keep track of time for sensors 90, thereby allowing a given item of data to be associated with the time at which the data was captured. For example, sensor 90 may recurrently capture readings of temperature, wind speed, humidity, appliance operating times, etc., and may timestamp each reading. The time at which the readings are taken may be used to reconstruct events or for other analytic purposes, such as those described herein. For example, the timestamps on wind speed readings taken during a hurricane may allow it to be determined, after the hurricane has occurred, how quickly the wind speed rose in the vicinity of the structure.

A storage component may further be provided and utilized to store data readings and/or timestamps in sensors 90. For example, a storage component may include, or may otherwise make use of, magnetic or optical disks, volatile random-access memory, non-volatile random-access memory, or any other type of storage device. There may be sufficient data storage capacity to store several hours or several weeks of data readings. For example, the severe part of a hurricane might last for half a day, a full day, or several days. A storage component might have sufficient storage capacity to allow twelve or more hours of readings to be stored, thereby allowing forensic reconstruction of how the hurricane affected the structure during the full time that the structure was experiencing the hurricane's impact.

A communication component may further be provided and utilized to communicate recorded information from structure computing device 300 to an external location, such as management module 105, which may be associated with an insurance carrier such as USAA. The communication component may be, or may comprise, a network communication card such as an Ethernet card, a WiFi card, or any other communication mechanism. However, the communication component could take any form and is not limited to these examples. The communication component might encrypt data that it communicates, in order to protect the security and/or privacy of the data. Additionally, data from sensors 90, a computerized clock and/or a storage component may be communicated directly to management module 105, via network 50, thus obviating or mitigating the need for dwelling computing device 300.

Management module 105 may include, or otherwise may cooperate with, retrieval engine 110. Retrieval engine 110 receives information from sensors 90 and/or dwelling computing device 300. In one embodiment, retrieval engine 110 sends a query to dwelling computing device 300 to respond with data generated by sensors 90. In another embodiment, retrieval engine 110 sends a query to sensors 90 to retrieve data they generated. In yet another embodiment, sensors 90 send data to retrieval engine 110 as the data is generated. In still another embodiment, sensors 90 store data and periodically (e.g., every night at 3:00 A.M.) send to retrieval engine. However, such is not an exhaustive list of methods of communicating data from sensors 90 to retrieval engine 110, and it is contemplated herein that data may be sent in any way as known in the art, including permutations of methods described herein.

In one embodiment a single instance of management module 105 receives communications from sensors 90 at a plurality of structures/locations (e.g., thousands of sensor locations communicating to a single management module 105), however it is contemplated herein that any permutation of sensor(s) 90 (including those of the same and differing types) and management module(s) 105 may be utilized as would be readily understood by those skilled in the art.

Management module 105 may further include data analysis engine 120 that analyzes data that has been generated by sensors 90. Data analysis engine 120 may apply business rules to determine if conditions have been met to allow or require modification of the terms of an insurance policy, such as lowering the deductible amount for a home insurance policy.

For exemplary purposes only, if humidity sensors 90 in the structure's basement detect consistently low levels of humidity, such may indicate a water-tight seal in the basement, and such may be sufficient to lower the deductible (e.g., lowering the deductible for all claims, or lowering the deductible for all water damage claims, or lowering the deductible for water damage claims in the basement alone). In another example, if temperature sensors 90, possibly in combination with (infrared) cameras detect that point sources of heat/fire (e.g., candles, hot plates, toaster ovens, oven, stove, grill, space heater) are never and/or rarely operated outside the presence of an attendant person, then such may be sufficient to lower the deductible (e.g., for all claims, for only fire damage claims, for only fire damage claims caused by point sources of heat/fire).

In yet another example, if gas detection sensor 90 detects low and/or non-existent levels of certain types of gases (e.g., propane, natural gas), such may indicate that the gas fixtures have been welded correctly, and such may be sufficient to lower the deductible (e.g., all claims, just fire-related damage claims, just fire-related damage claims caused by the gas being tested). In still another example, if gas detection sensor 90 detects low and/or non-existent levels of certain types of gases (e.g., gases that may leak into the basement through the wall such as radon) in the basement and/or the structure, such may indicate good waterproofing of the basement and/or a lack of cracks in the structure's support walls and foundation, and thus that may be sufficient to lower deductibles (e.g., for all claims, for only gas related claims, for only water damage claims, for all stability type claims such as those related to damages caused by earthquakes).

In another example, electrical sensor 90 or plumbing sensor 90 may indicate that the electrical system or the plumbing system, respectively, are operating (well) within normal parameters, and thus such data may be interpreted, by data analysis engine 120, as worthy of lowering the deductible (e.g., for all claims, just claims caused by the electrical system, just claims caused by the plumbing system).

In even another example, air pressure sensor 90, air speed sensor 90, and camera 90 may, working independently or in concert, indicate that the chance of a weather related damage is low, and thus lower the deductible. One such situation may be if air speed sensor 90 indicates high speed winds occur infrequently. Another such situation may be if camera 90 indicates that no/few trees and/or other things are within range of falling on the structure in the event of (severely) adverse weather. Another such situation may be if air pressure sensor 90 indicates that rapid changes in air pressure are rare/infrequent, or the air pressure never/infrequently falls below a certain threshold (e.g., 980 millibars (mb), 985 mb, 990 mb, 1,000 mb).

Management module 105 may further include command generation engine 130. Command generation engine 130 may send commands to sensors 90. Such commands may be sent through intermediary dwelling computing device 300, or such commands may be sent directly to sensors 90. Such commands may include, for exemplary purposes only and without limitation, an instruction to take an immediate reading, an instruction to take a series of readings (e.g., every five minutes for one hour, every minute for one week), an instruction to take more frequent readings (e.g., every hour rather than every six hours), an instruction to take less frequent readings (e.g, every day rather than every hour), and/or any permutations or derivations thereof as will be known by those skilled in the art.

Management module 105 may further include policy analysis engine 140. Policy analysis engine 140 may analyze the data such as described above with respect to data analysis engine 120. It is contemplated herein that data analysis engine 120 and policy analysis engine 140 may work in cooperation/tandem, independently of each other, without interaction with the other, or any other permutations or derivations thereof as will be known by those skilled in the art.

Figure 3:
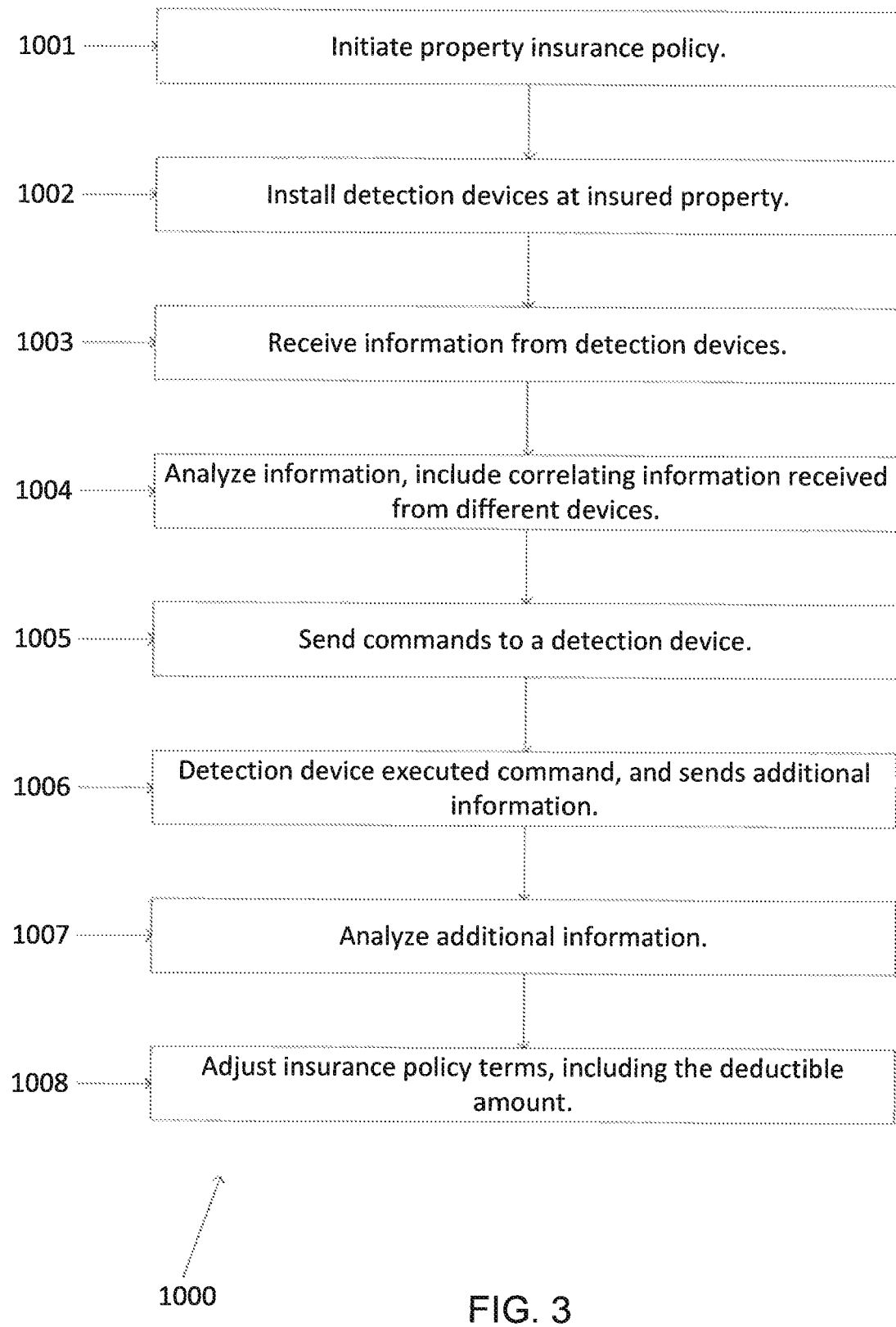
FIG. 3 is a flow diagram of operational steps of the structural informatics module of FIG.

FIG. 3 shows, in the form of a flow chart (process 1000), exemplary operational steps of utilizing system 100. Before turning to descriptions of FIG. 3, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 3 shows an example in which operational steps are carried out in a particular order, as indicated by the lines connecting the blocks, but the various steps shown in these diagrams can be performed in any order, or in any combination or sub-combination.

With reference to FIG. 3, starting at step 1001, a property insurance policy is initiated. It is to be appreciated the property insurance policy can be associated with a dwelling or otherwise provides insurance protection for an insured for other purposes where insurance protection is desired. This policy may preferably be stored in memory 340, such as database 346. In one embodiment, policy analysis engine 140 has access to the policy, such as to the terms of the policy (e.g., premium, deductible, coverage limit or amount, coverage type).

Detection devices, such as sensors 90, are installed at a property, such as a structure, covered by the insurance policy (step 1002). In one embodiment, sensors 90 may have been previously installed for other reasons (e.g., security cameras) and later re-configured to integrate with system 100. In another embodiment, sensors 90 are installed for at least the reason of integrating with and working with system 100. In still another embodiment, sensors 90 include a combination of pre-installed sensors 90 and newly-installed sensors 90.

Subsequently, information (informatic data) is received from sensors 90 (step 1003). As discussed above, which information may be sent from sensors 90 to structure computing device 300, and subsequently to management module 105. In another embodiment, structure computing device 300 is not installed onsite and sensors 90 communicate directly to management module 105. In yet another embodiment, structure computing device 300 is installed onsite, and sensors 90 communicate directly to management module 105, through structure computing device, and/or a combination thereof.

Information captured from sensors 90 is analyzed by management module 105 (step 1004), such as by data analysis engine 120 and/or policy analysis engine 140 to preferably determine, preferably via an analysis, a risk assessment value regarding a dwelling and/or other risk associated with the insured to which the captured informatic sensor data is relevant. In one embodiment, data analysis engine 120 considers the data and identifies prospective situations that may warrant modifying the terms (step 1008) of an insurance policy (e.g., lowering deductible, increasing coverage amount, lowering premium, increasing types of situations covered, adjusting one term of a specific coverage and/or the entire policy), preferably via predefined business rules utilizing preferably the aforesaid risk assessment value. It is to be appreciated the predefined business rules may be general in nature applicable to plural similarly situated insured's or may be specific to a particular insured. In this embodiment, prospective situations are communicated to policy analysis engine 140, and policy analysis engine 140 decides if a modification of the insurance policy may be allowed or required. This may include considering the initial policy terms and, based on the initial policy terms, deciding if a first modification is required or allowed. This may also include considering the initial policy terms and, based on the initial policy terms, deciding if an additional modification is required or allowed. This may further include considering the current policy terms and, based on the current policy terms, deciding if a modification is required or allowed. This may also include determining, based on information captured from sensors 90, a deductible amount for a subject policy. Thus, if the policy's current deductible does not match the aforementioned determined deductible, the current deductible is either lowered or increased to match the determined deductible (via information captured from sensors 90).

In one embodiment, command generation engine 130 may send additional commands to sensors 90 and/or structure computing device 300 (step 1005), such as via structure computing device 300 and/or directly to sensors 90. These commands may alter the types of measurements being performed, the frequency of measurements, the speed/frequency in which information is communicated from sensors 90, and/or any other settings. Subsequent to additional commands being sent to sensors 90, sensors 90 and/or structure computing device 300 execute and/or perform the additional commands and send additional information to management module 105 (step 1006). The additional information may be analyzed independent of the previously received information, and/or it may be analyzed and/or correlated with the previously received information (step 1007).

In one embodiment, information received at management module 105 is immediately analyzed and then discarded. In another embodiment the information is analyzed and stored temporarily. In yet another embodiment, the information is stored for later analysis. And in still another embodiment, the information is stored via another device/module/engine.

If a modification of the insurance policy is required or allowed, in one embodiment policy analysis engine 140 adjusts the policy's terms and optionally subsequently notifies the insured, policyholder, and/or the insurer. In another embodiment, the policy analysis engine 140 sends a notification that the insured qualifies for a policy term modification, the notification being sent to the insured, policyholder, and/or the insurer.

The term "module"/"engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What we claim is:
1. A computer system for processing environment condition data, comprising:
   an electronic sensor, configured to collect environment condition data corresponding to an environment;
   a processor in communication with the electronic sensor, wherein the processor is configured to:
   identify the environment as an environment to monitor for environmental changes;
   in response to identifying the environment, generate a sensor control instruction requesting the electronic sensor to modify a data capture frequency;
   transmit the instruction to the electronic sensor to modify a frequency of data capture by the electronic sensor;
   in response to transmitting the instruction, receive environmental condition data corresponding to the data capture frequency, from the electronic sensor;
   upon the environmental condition data corresponding to the data capture frequency breaching an operational parameter threshold, identify a modification to be implemented, the modification associated with the environment; and
   based upon identifying the modification, transmit an electronic notification to an electronic device asso- ciated with the environment to cause the electronic device to display an indication of the identified modification.

2. The computer system as recited in claim 1, wherein the processor is further configured to transmit an electronic notification to an electronic device associated with the environment.

3. The computer system as recited in claim 1, wherein the environment comprises a plurality of properties in a common geographical area, owned by different owners.

4. The computer system as recited in claim 1, wherein the processor is further configured to transmit an insurance claim to an insurance server associated with the environment.

5. The computer system as recited in claim 1, wherein the processor is further configured to modify an insurance data record associated with the environment based on the identified modification.

6. The computer system as recited in claim 5, wherein modification of the insurance data record is selected from the group consisting of reduction of an insurance deductible and elimination of an insurance deductible.

7. The computer system as recited in claim 5, wherein the electronic sensor comprises at least one of a temperature sensor; a humidity sensor; a gas sensor; a smoke sensor; a water pressure sensor; a water flow sensor; a wind speed sensor; an air pressure sensor; an electrical system sensor; a structural sensor; an environmental sensor; and a camera.

8. The computer system as recited in claim 1, wherein the processor is configured to identify a time period associated with the modification.

9. The computer system as recited in claim 1, wherein the processor is configured to transmit the electronic notification to an insurance service maintaining insurance coverage data associated with the environment.

10. The computer system as recited in claim 1, wherein the processor is configured to ascribe, from a clock signal, a time when the environment condition data was captured.

11. A computer method comprising:
identifying an environment as an environment to monitor for environmental changes;
in response to identifying the environment, generating a sensor control instruction requesting an electronic sensor to modify a data capture frequency, wherein the electronic sensor is configured to collect environment condition data corresponding to an environment;
transmitting the instruction to the electronic sensor to modify a frequency of data capture by the electronic sensor;
in response to transmitting the instruction, receiving environmental condition data corresponding to the data capture frequency, from the electronic sensor;
upon the environmental condition data corresponding to the data capture frequency breaching an operational parameter threshold, identifying a modification to be implemented, the modification associated with the environment; and
based upon identifying the modification, transmitting an electronic notification to an electronic device associated with the environment to cause the electronic device to display an indication of the identified modification.

12. The computer method as recited in claim 11, wherein the electronic device is a computer hosted by an insurer of the environment.

13. The computer method as recited in claim 12, comprising transmitting an insurance claim to the electronic device.

14. The computer method as recited in claim 11, wherein the electronic device is identified based upon being possessed by an insured of the environment.

15. The computer method as recited in claim 11, wherein the modification comprises a modification to an insurance data record.

16. The computer method of claim 15, wherein the modification to the insurance data record is selected from the group consisting of reduction of an insurance deductible and elimination of an insurance deductible.

17. The computer method as recited in claim 15, wherein environment condition data comprises at least one of a temperature; humidity; gas presence; smoke presence; water pressure; water flow; wind speed; air pressure; electrical system issues; structural issues; environmental issues; and camera-based visual imagery.

18. The computer method as recited in claim 11, comprising:
identifying a portion of the environment associated with the breaching of the operational parameter threshold; and
limiting the modification to the portion of the environment and not other portions of the environment.

19. The computer method as recited in claim 18, wherein the modification comprises a coverage or deductible change for the portion of the portion of the environment.

20. The computer method as recited in claim 18, comprising:
identifying a first portion of the environment that breached the operational parameter threshold and a second portion of the environment that breached a second operational parameter threshold; and
identifying the modification based upon both the first portion breaching the operational parameter threshold and the second portion of the environment breaching the second operation parameter threshold.

* * * * *